United States Patent
Wang et al.

(10) Patent No.: US 10,618,164 B2
(45) Date of Patent: Apr. 14, 2020

(54) ROBOT SYSTEM HAVING LEARNING CONTROL FUNCTION AND LEARNING CONTROL METHOD

(71) Applicant: FANUC CORPORATION, Yamanashi (JP)

(72) Inventors: Kaimeng Wang, Yamanashi (JP); Satoshi Inagaki, Yamanashi (JP); Wenjie Chen, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 135 days.

(21) Appl. No.: 15/892,990

(22) Filed: Feb. 9, 2018

(65) Prior Publication Data

US 2018/0229364 A1    Aug. 16, 2018

(30) Foreign Application Priority Data

Feb. 15, 2017  (JP) ................... 2017-026317

(51) Int. Cl.
*G05B 19/04* (2006.01)
*B25J 9/16* (2006.01)

(52) U.S. Cl.
CPC ............. *B25J 9/163* (2013.01); *B25J 9/1694* (2013.01); *G05B 2219/39241* (2013.01); *Y10S 901/46* (2013.01)

(58) Field of Classification Search
CPC ................... B25J 9/163; B25J 9/1694; G05B 2219/39241; Y10S 901/46
See application file for complete search history.

(56) References Cited

U.S. PATENT DOCUMENTS

| | | | | |
|---|---|---|---|---|
| 2005/0113973 | A1* | 5/2005 | Endo | B25J 9/161 700/245 |
| 2012/0277912 | A1* | 11/2012 | Kirihara | B25J 9/1653 700/258 |
| 2014/0009100 | A1* | 1/2014 | Sera | G05B 5/01 318/611 |
| 2015/0183114 | A1* | 7/2015 | Takahashi | B25J 9/1692 700/253 |

(Continued)

FOREIGN PATENT DOCUMENTS

| | | |
|---|---|---|
| CN | 1762670 A | 4/2006 |
| CN | 102189550 A | 9/2011 |

(Continued)

*Primary Examiner* — Khoi H Tran
*Assistant Examiner* — Jorge O Peche
(74) *Attorney, Agent, or Firm* — Hauptman Ham, LLP

(57) ABSTRACT

A robot system is provide with a robot control device that includes an operation control unit and a learning control unit. The learning control unit performs a learning control in which a vibration correction amount for correcting a vibration generated at a control target portion of a robot is calculated and the vibration correction amount is employed in the operation command at a next time. The learning control unit includes a plurality of learning control parts for calculating the vibration correction amount and a selection unit that selects one of the plurality of learning control parts on the basis of operation information of the robot when the robot is made to be operated by an operation program that is a target of the learning control.

6 Claims, 6 Drawing Sheets

(56) References Cited

U.S. PATENT DOCUMENTS

| | | | |
|---|---|---|---|
| 2016/0184996 A1* | 6/2016 | Ishige | B25J 9/1692 |
| | | | 700/254 |
| 2017/0144301 A1* | 5/2017 | Washizu | B25J 9/1679 |
| 2018/0079076 A1* | 3/2018 | Toda | G06N 3/008 |
| 2018/0089589 A1* | 3/2018 | Ooba | G05B 19/4182 |
| 2018/0207797 A1* | 7/2018 | Yamaoka | B25J 9/163 |
| 2018/0231953 A1* | 8/2018 | Watanabe | G05B 13/0265 |
| 2018/0257239 A1* | 9/2018 | Wang | B25J 13/088 |
| 2018/0281183 A1* | 10/2018 | Hiraide | B25J 9/1628 |
| 2018/0281184 A1* | 10/2018 | Kudo | B25J 9/1641 |
| 2018/0281186 A1* | 10/2018 | Hiraide | B25J 9/1641 |
| 2018/0341244 A1* | 11/2018 | Xu | G06N 20/00 |
| 2019/0001490 A1* | 1/2019 | Washizu | B25J 9/163 |
| 2019/0009407 A1* | 1/2019 | Iwanami | B65G 43/00 |
| 2019/0061149 A1* | 2/2019 | Inagaki | B25J 9/163 |
| 2019/0099888 A1* | 4/2019 | Takikawa | B25J 9/1694 |
| 2019/0160664 A1* | 5/2019 | Nakagawa | B25J 9/1602 |
| 2019/0227528 A1* | 7/2019 | Abbott | B25F 5/00 |
| 2019/0248006 A1* | 8/2019 | Takahashi | B25J 13/088 |
| 2019/0250069 A1* | 8/2019 | Samadani | F16C 19/52 |
| 2019/0255709 A1* | 8/2019 | Inagaki | B25J 19/02 |
| 2019/0308316 A1* | 10/2019 | Washizu | B25J 13/089 |

FOREIGN PATENT DOCUMENTS

| | | |
|---|---|---|
| CN | 102785046 A | 11/2012 |
| JP | H5-88721 A | 4/1993 |
| JP | H7-314360 A | 12/1995 |
| JP | 10-111701 A | 4/1998 |
| JP | 2011-167817 A | 9/2011 |
| JP | 2012-240103 A | 12/2012 |

* cited by examiner

ROBOT SYSTEM HAVING LEARNING CONTROL FUNCTION AND LEARNING CONTROL METHOD

RELATED APPLICATIONS

The present application claims priority to Japanese Patent Application No. 2017-026317 filed on Feb. 15, 2017, the disclosure of which is hereby incorporated by reference herein in its entirety.

BACKGROUND OF THE INVENTION

1. Field of the Invention

This invention relates to a robot system having a learning control function and a learning control method.

2. Description of the Related Art

In a production site at which a robot is used, there are cases in which in order to improve the production efficiency, it is demanded that an operation of the robot is accelerated so as to shorten a tact time. However, when the operation of the robot is accelerated to a certain degree or more, vibrations may be generated at a hand tip portion at a tip end of the robot during an operation due to a strain of a reducer, a rigidity shortage of an arm portion itself of the robot, or the like.

As a method for solving such a problem, hitherto, it has been performed that an acceleration sensor is attached to the hand tip portion of the robot and a learning control is repeatedly performed while the acceleration sensor measures vibrations of the robot during an operation, thereby reducing such vibrations (e.g., see Japanese Unexamined Patent Publication No. 2011-167817). In the learning control as described above, during an operation of the robot based on a predetermined operation program, a vibration correction amount for correcting the vibrations is calculated on the basis of data of vibrations that are acquired by the acceleration sensor. The vibration correction amount as calculated is employed in a servo control by the same operation program at a next time.

In the robot, an orientation of the robot changes depending on a use range of the robot, i.e., a movement range of an end effector attached to the hand tip portion. Characteristics of vibrations that are generated at the robot are largely different between the use ranges in which the orientations of the robot are largely different.

Thus, when the learning control is applied to the robot, an ability of reducing vibrations by the learning control at the time when the use range of the robot is changed, i.e., the robustness is important.

In such a respect, it has been proposed that a frequency response is measured with respect to each of different orientations of the robot and a learning control part that ensures the robustness with respect to all orientations is designed (e.g., see Japanese Unexamined Patent Publication No. 2011-167817).

Further, the use range of the robot may also change depending on the type of the end effector, such as a holding hand or a welding gun. In such a respect, there has been proposed a method in which in the learning control, parameters of a neural network are changed in accordance with a load applied to the robot so as to accurately estimate vibrations and the robustness relative to a change of the load is ensured on the basis of the vibrations (e.g., Japanese Unexamined Patent Publication No. H10-111701).

SUMMARY OF INVENTION

The robot that is a target of the learning control cannot start an actual operation if the learning control is not terminated. Thus, not only the robustness as described above but also the acquisition of an optimal vibration correction amount with the fewest number of times of the learning control are important. However, if the single learning control part that ensures the robustness as described above is aimed to be designed with respect to a wide use range of the robot in which the orientation of the robot or the end effector may largely change, there has been a problem that a required number of times of the learning control increases in order to acquire an optimal vibration correction amount.

Accordingly, it has been desired that a number of times of the learning control can be suppressed from increasing while a vibration reduction effect by the learning control is maintained in a supposed use range of the robot.

According to one aspect of the present disclosure there is provided a robot system including a robot, a robot control device that includes an operation control unit for controlling an operation of the robot, and a sensor that detects a vibration generated at a control target portion of the robot. The robot control device includes a learning control unit that performs a learning control in which a vibration correction amount for correcting the vibration generated when the operation control unit makes the robot to operate by an operation command is calculated and the vibration correction amount is employed in the operation command at a next time.

Further, according to the aspect of the present disclosure, the learning control unit can include a plurality of learning control parts for calculating the vibration correction amount, the plurality of learning control parts being respectively assigned to a plurality of use ranges that are supposed in the robot, and a selection unit that selects one from among the plurality of learning control parts on the basis of operation information of the robot when the robot is made to be operated by an operation program that is a target of the learning control.

The operation information can include information of a position to which a tip end portion of the robot is made to move, and information of a load that is applied to the tip end portion by an end effector, and each of the use ranges can be a range that is defined by both the range of the position to which the tip end portion of the robot is made to move and the range of the load in accordance with the end effector.

According to another aspect of the present disclosure, there is provided a learning control method of a robot for performing a learning control in which a vibration correction amount for correcting a vibration generated at a control target portion of a robot when the robot is made to be operated on the basis of an operation command is calculated and the vibration correction amount is employed in the operation command at a next time.

Further, the learning control method can include a step of acquiring operation information of the robot from an operation program that is a target of the learning control by a computer including a plurality of learning control parts for calculating the vibration correction amount, the plurality of learning control parts being respectively assigned to a plurality of use ranges that are supposed in the robot, a step of selecting one from among the plurality of learning control parts by the computer on the basis of the operation information, and a step of performing the learning control by a selected learning control part of the computer.

In the learning control method according to another aspect as described above as well, the operation information can include information of a position to which a tip end portion of the robot is made to move, and information of a load that is applied to the tip end portion by an end effector, and each of the use ranges can be a range that is defined by both the range of the position to which the tip end portion of the robot is made to move and the range of the load in accordance with the end effector.

Such objects, features, and advantages according to one aspect of the present disclosure and other objects, features, and advantages will become further clear from the detailed description of typical embodiments of the present disclosure that are illustrated in the attached drawings.

DETAILED DESCRIPTION

Figure 1:
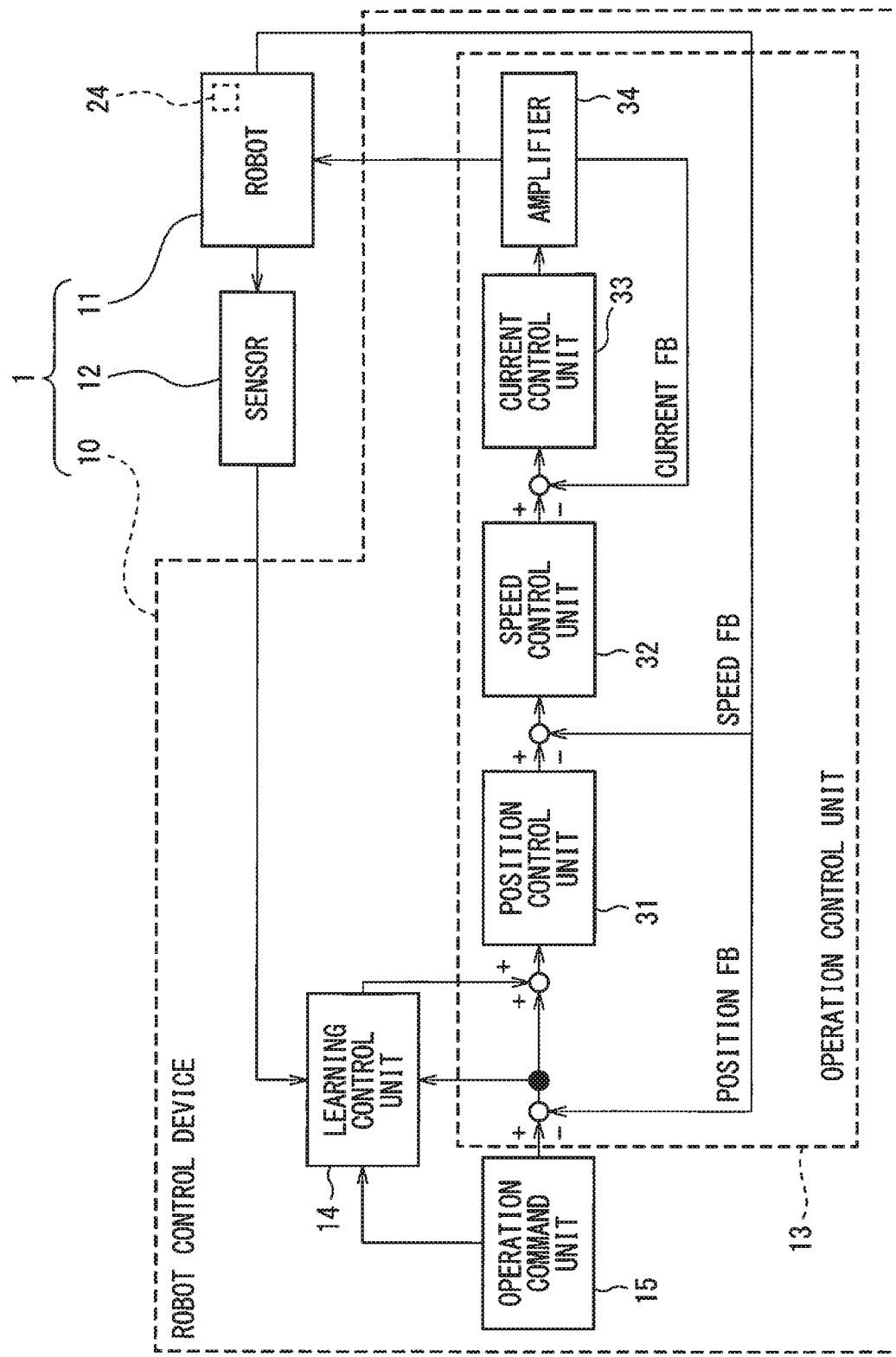
FIG. 1 is a block diagram for illustrating a robot system according to one embodiment.

Embodiments of the present disclosure will be described with reference to the drawings. In the drawings for reference, similar constitutional parts or functional parts are provided with the same reference signs. These figures are suitably changed in scale in order to facilitate understanding. Further, embodiments as illustrated in the drawings are examples so as to carry out this invention, and this invention is not to be limited to the embodiments that are illustrated in the drawings.

Figure 2:
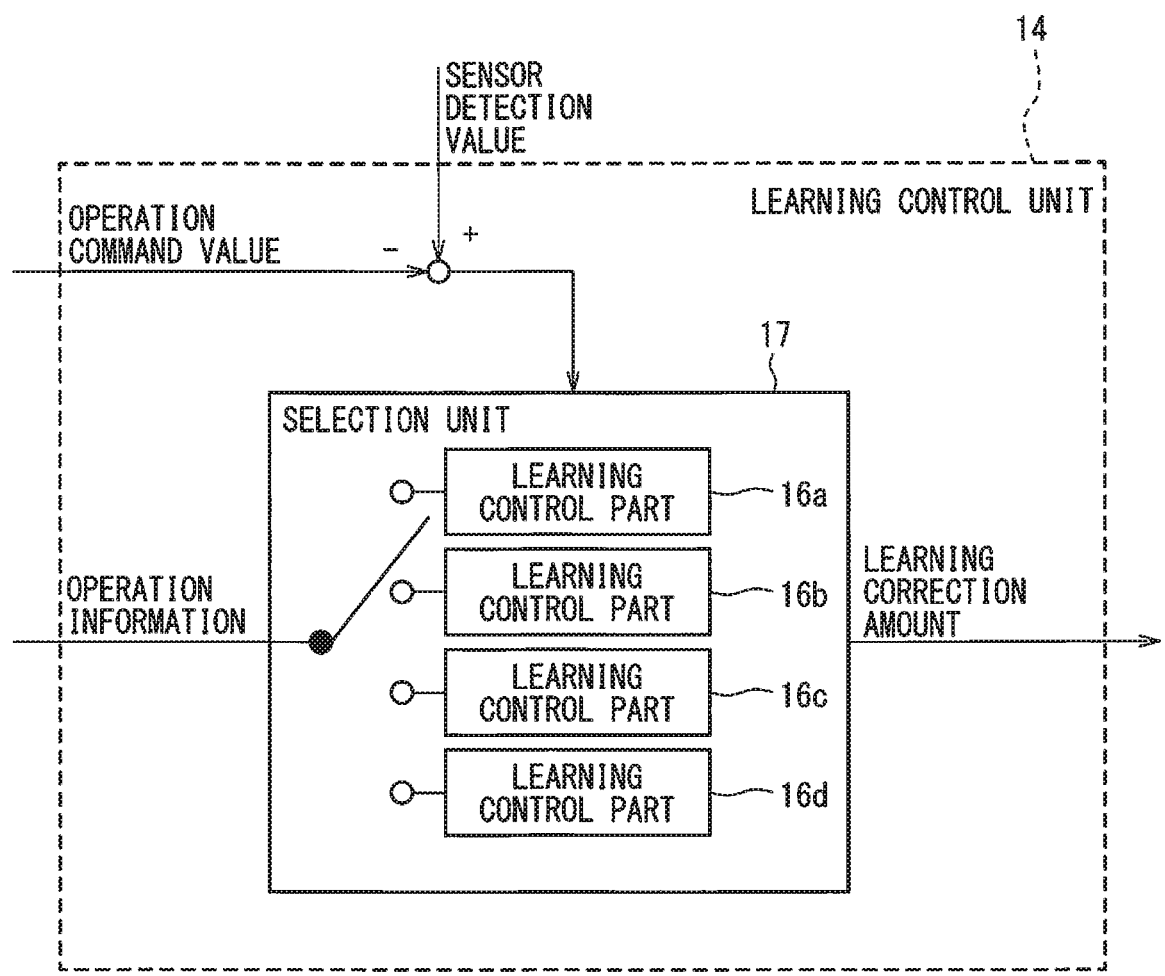
FIG. 2 is a diagram schematically illustrating a configuration example of a learning control unit.

FIG. 1 is a block diagram for illustrating a robot system 1 according to one embodiment. FIG. 2 is a diagram schematically illustrating a configuration example of a learning control unit 14 as illustrated in FIG. 1.

As illustrated in FIG. 1, the robot system 1 includes a robot 11 and a robot control device 10 that includes an operation control unit 13 for controlling an operation of the robot 11. The robot system 1 includes a sensor 12 that detects vibration generated at a control target portion of the robot 11.

The robot 11 may be a vertical articulated robot, a horizontal articulated robot, a parallel link robot, or the like. Further, the control target portion of the robot 11 as described above may be a hand tip portion at a tip end of a robot arm portion (hereinafter, occasionally referred to as tip end portion) to which an end effector can be attached. The end effector is a holding hand, a machining tool, a welding gun, a laser irradiation device, or the like.

The robot control device 10 further includes the learning control unit 14 that performs a learning control in which a vibration correction amount for correcting the vibration that is generated at the control target portion of the robot 11 when the operation control unit 13 makes the robot 11 to operate by an operation command is calculated, and the vibration correction amount is employed in the same operation command at a next time.

Further, the robot control device 10 includes an operation command unit 15 that generates the operation command as described above on the basis of an operation program that is a target of the learning control and outputs the same to the operation control unit 13, and outputs operation information of the robot 11 that is described in advance in the operation program to the learning control unit 14.

The robot control device 10 is a computer system. The operation program as described above is stored in a memory (unillustrated) by a robot teaching in advance in the robot control device 10.

In the operation command unit 15, a central processing unit (CPU) of a computer that is configured in such a manner as to read the operation program stored in the memory and generate an operation command value can be employed. Such an operation command unit 15 may be also provided not in the robot control device 10 but in a host computer (unillustrated) that is connected to the robot control device 10. Further, a computer also can be employed in each of the operation control unit 13 and the learning control unit 14.

As illustrated in FIG. 2, the learning control unit 14 includes a selection unit 17 that selects one from among a plurality of learning control parts 16a to 16d for calculating the vibration correction amount as described above.

The plurality of learning control parts 16a to 16d are respectively assigned to a plurality of use ranges into which a supposed use range UR of the robot 11 is divided.

The selection unit 17 is configured in such a manner as to specify one from among the plurality of use ranges as described above on the basis of the operation information of the robot 11 when the robot is made to operate by the operation program as described above that is a target of the learning control. The selection unit 17 is configured in such a manner as to select the learning control part that corresponds to the specified use range from among the plurality of learning control parts 16a to 16d.

The operation information of the robot 11 as described above includes information of a position to which the tip end portion of the robot 11 is made to move and information of a load that the end effector applies to the tip end portion. Such information can be acquired on the basis of the operation program as described above. Note that since an orientation of the robot 11 changes in accordance with the position of the tip end portion (hand tip portion) of the robot 11, the information of the position to which the tip end portion of the robot 11 is made to move as described above can be also considered to be information of an orientation that the robot 11 can make during the operation.

Each of the plurality of use ranges as described above can be a range that is defined by both a range of the position to which the tip end portion of the robot 11 is made to move and a range of the load in accordance with the end effector as described above.

Figure 3:
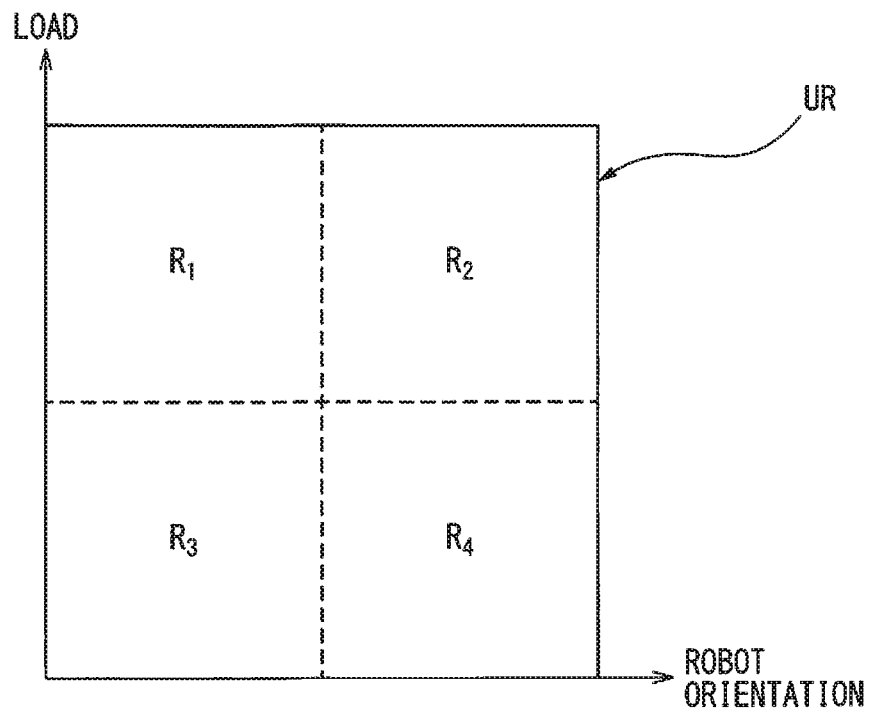
FIG. 3 is a diagram illustrating one example of a supposed use range of a robot.

FIG. 3 is a diagram illustrating one example of the supposed use range UR of the robot 11 as described above.

For example, as illustrated in a graph illustrated in FIG. 3, the supposed use range UR of the robot 11 is defined by both a supposed range of an orientation that the robot 11 can make and a supposed range of a load that is applied to the hand tip portion of the robot 11 in accordance with the end effector. In the graph, it is designed that the horizontal axis indicates the supposed range of the robot orientation and the vertical axis indicates the supposed range of the load in accordance with the end effector.

The supposed use range UR is divided into four small ranges $R_1$ to $R_4$. The learning control parts 16a to 16d as described above are respectively assigned to the four small ranges $R_1$ to $R_4$. In such a case, the learning control unit 14 is configured to acquire both information of an orientation that the robot 11 can make and information of a load that the end effector applies to the tip end portion of the robot 11 as the operation information of the robot 11 as described above.

The selection unit 17 of the learning control unit 14 specifies one from among the four small ranges $R_1$ to $R_4$ on the basis of both information of a robot orientation and information of the load by the end effector as acquired. The selection unit 17 is configured to select the learning control part that corresponds to the small range as specified.

More specifically, in the operation program of the robot 11, a target position to which the hand tip portion of the robot 11 is moved from a start position is described. For example, there is a case in which the arm portion of the robot 11 is made to rotate and the hand tip portion of the robot 11 is made to move only in a range distant from a robot base portion. Further, there is a case in which the arm portion of the robot 11 is made to rotate and the hand tip portion of the robot 11 is made to move only in a range close to the robot base portion. The orientation of the robot 11 when the hand tip portion is made to move only in a range distant from the robot base portion differs from an orientation of the robot 11 when the hand tip portion is made to move only in a range close to the robot base portion. Accordingly, the operation command unit 15 extracts a minimum value and a maximum value of the target position of the hand tip portion of the robot 11 from the operation program and can estimate a movement range of the hand tip portion of the robot 11 on the basis of the values. In the graph of FIG. 3, such a movement range of the hand tip portion of the robot 11 is defined as the range of an orientation that the robot 11 can make.

Further, a type of the end effector to be used and the command as to how the robot 11 is operated is programmed in the operation program of the robot 11. For example, the operation program in which the robot 11 performs the operation for pick and place of a workpiece by using a holding hand as the end effector is created. Alternatively, the operation program in which the robot 11 performs spot welding by using a spot welding gun as the end effector is created. The robot control device 10 stores, in the memory in advance, data of a load mass of each type (e.g., a holding hand, a spot welding gun, or the like) of end effector that can be attached to the tip end portion of the robot 11. The operation command unit 15 specifies the type of the end effector from the operation program as described above. The operation command unit 15 can read data of a load mass that corresponds to the end effector as defined from the memory as the operation information of the robot 11 and output the same to the learning control unit 14.

Thus, as described above, the learning control unit 14 can acquire both information of the orientation of the robot 11 and of the load by the end effector from the operation command unit 15.

Note that the embodiment as described above is merely an example. The supposed use range UR of the robot 11 is divided into the four small ranges $R_1$ to $R_4$, however, a number of times of division is not limited to this embodiment. With respect to the graph of FIG. 3, the range of the robot orientation that is indicated by the horizontal axis may be divided into three or more ranges. Alternatively, the range of the load that is indicated by the vertical axis may be divided into three or more ranges.

Figure 4:
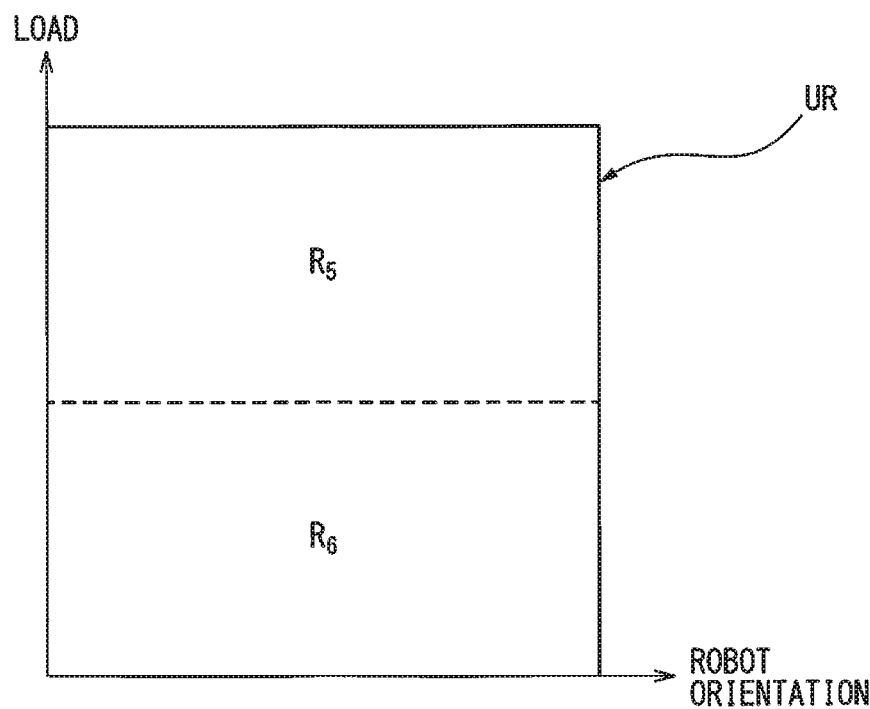
FIG. 4 is a diagram illustrating an additional example with respect to the supposed use range as illustrated in FIG. 3.

Further, FIG. 4 is a diagram illustrating an additional example with respect to the supposed use range UR as illustrated in FIG. 3. Depending on the operation program, a range of the orientation that the robot 11 can make, i.e., the movement range of the tip end portion of the robot 11 may not fall within each of the small ranges $R_1$ to $R_4$. Then, as illustrated in FIG. 4, a medium range $R_5$ that stretches over both the small range $R_1$ and the small range $R_2$ and a medium range $R_6$ that stretches over both the small range $R_3$ and the small range $R_4$ may be also supposed. Then, two additional learning control parts for calculating the vibration correction amount as described above may be also respectively assigned to the medium range $R_5$ and the medium range $R_6$. By adopting this configuration, the robot control device 10 can perform the effective learning control even when the robot orientation (i.e., a position of the hand tip portion) that exceeds each of the small ranges $R_1$ to $R_4$ is obtained from the operation program that is the target of the learning control.

Figure 5:
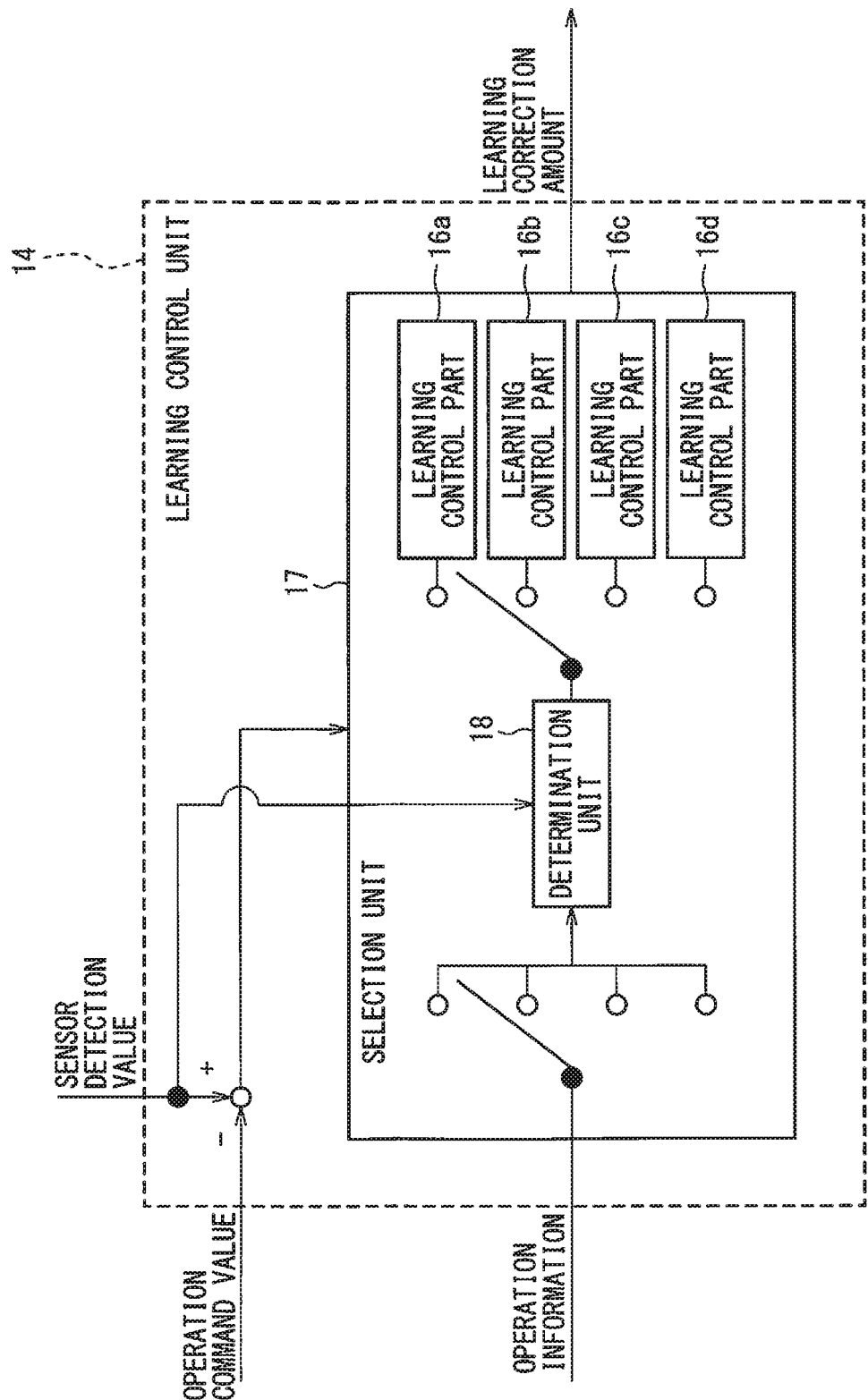
FIG. 5 is a diagram schematically illustrating another configuration example of the learning control unit.

FIG. 5 is a diagram schematically illustrating another configuration example of the learning control unit 14. The learning control unit 14 as described above may also include, as illustrated in FIG. 5, a determination unit 18 that is configured in such a manner as to determine whether or not the learning control part selected by the selection unit 17 is optimal on the basis of a detection value of the sensor 12 while the learning control is performed, i.e., information of the vibration generated at the control target portion of the robot 11.

The term "the learning control part is optimal", herein indicates that the vibration at the control target portion as described above is reduced by the selected learning control unit.

Further, in a case of another configuration example as illustrated in FIG. 5, when the learning control part selected by the selection unit 17 is determined to be not optimal by the determination unit 18, the selection unit 17 performs switching to another learning control part from among the plurality of learning control parts 16a to 16d. The selection unit 17 can perform switching of the learning control parts until the determination unit 18 determines that the selected learning control part is optimal.

Figure 6:
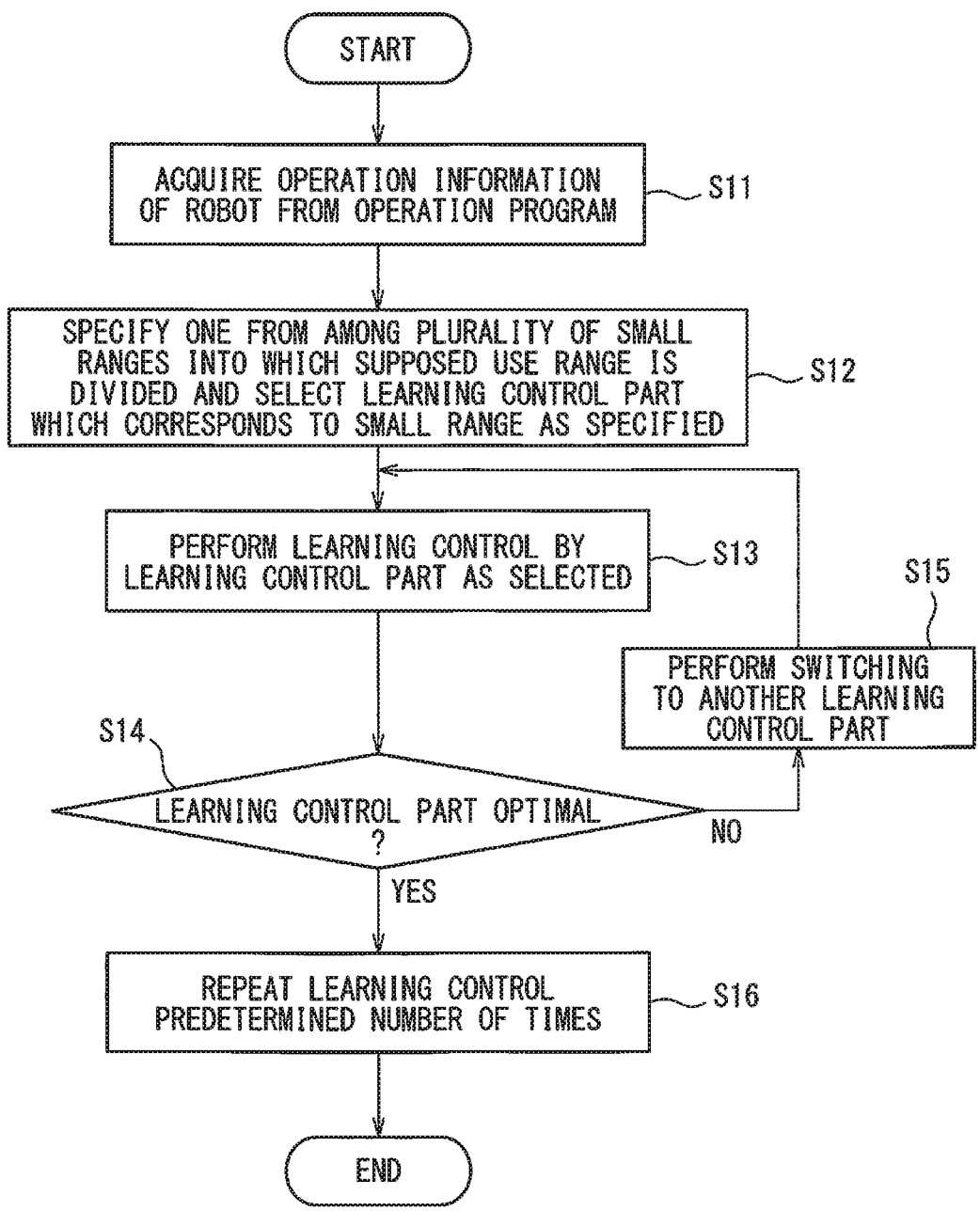
FIG. 6 is a flowchart illustrating one example of a process flow that is performed by the learning control unit.

FIG. 6 is a flowchart illustrating one example of a learning control method that is performed by the robot control device 10 as described above. A process flow as illustrated in FIG. 6 is one example of a robot control method of the present disclosure. The robot control device 10 that executes the process flow as illustrated in FIG. 6 can be configured by a digital computer.

First, at step S11 of FIG. 6, the robot control device 10 acquires the operation information of the robot 11 from the operation program that is a target of the learning control.

At subsequent step S12, the robot control device 10 specifies one from among the plurality of small ranges $R_1$ to $R_4$ into which the supposed use range UR of the robot 11 is divided on the basis of the operation information as acquired, and selects the learning control part that corresponds to the specified small range from among the plurality of learning control parts 16a to 16d.

At subsequent step S13, the robot control device 10 performs the learning control by the selected learning control part.

At subsequent step S14, the robot control device 10 determines whether or not the selected learning control part is optimal on the basis of a detection value of the sensor 12, i.e., information of the vibration generated at the robot 11.

In a determination result at step S14, when the learning control part as selected is not optimal, the robot control device 10 performs switching to another learning control part from among the plurality of learning control parts 16a to 16d (step S15). Further, the robot control device 10 repeats step S13 to step S15 as described above until the selected learning control part is determined to be optimal.

On the other hand, in the determination result at step S14, when the selected learning control part is optimal, the robot control device 10 repeatedly performs the learning control by the selected learning control part a predetermined number of times (step S16), and the learning control is terminated.

Further, the robot system 1 according to one embodiment will be specifically described.

Figure 7:
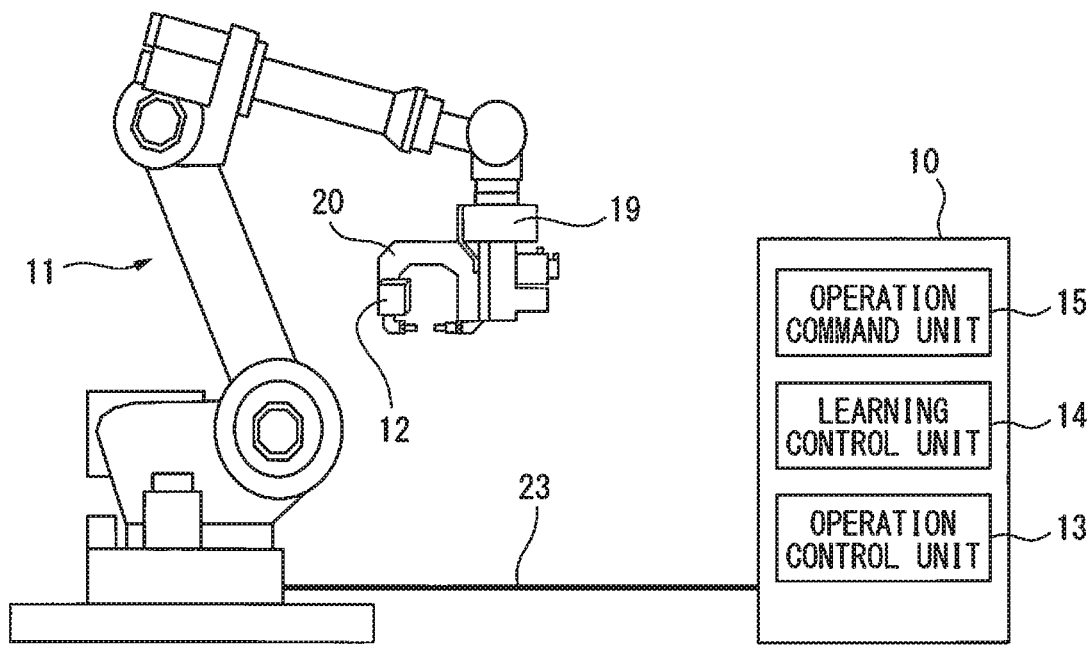
FIG. 7 is a diagram illustrating one example of the robot that can be employed in the robot system according to one embodiment.
Figure 8:
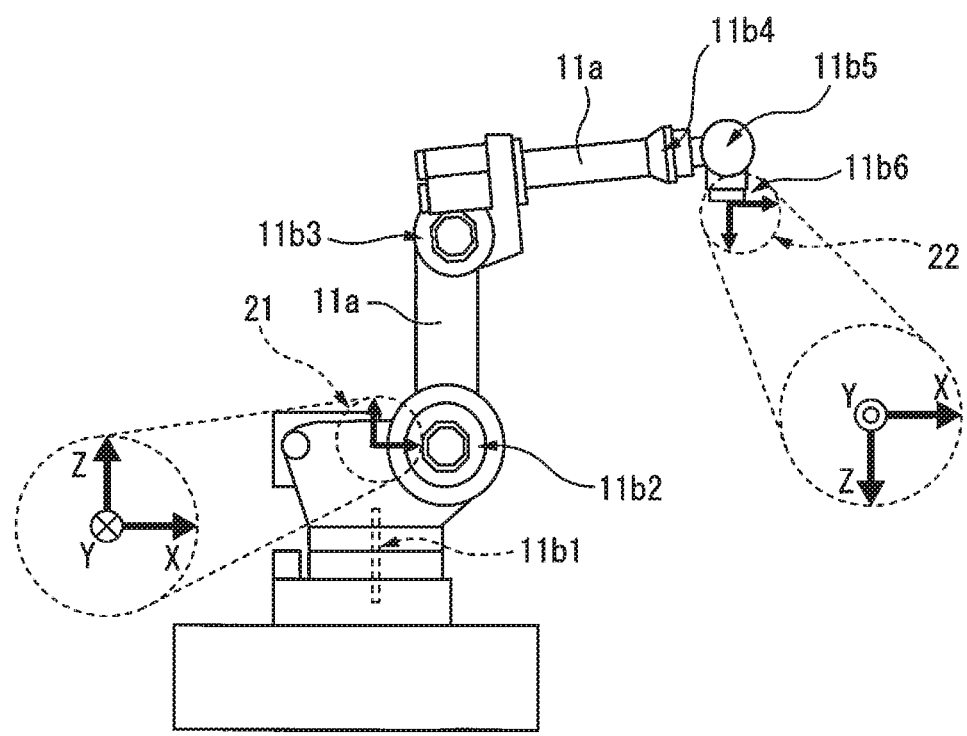
FIG. 8 is a diagram for illustrating constitutional elements and coordinate systems of the robot as illustrated in FIG. 7.

FIG. 7 is a diagram illustrating one example of the robot 11 that can be employed in the robot system 1 as described above. FIG. 8 is a diagram for illustrating constitutional elements and coordinate systems of the robot 11 as illustrated in FIG. 7.

The robot 11 according to the present embodiment is a six-axis vertical articulated robot as illustrated in FIG. 7. As illustrated in FIG. 8, the robot 11 is provided with six joint axes 11b1 to 11b6, an arm portion 11a that is coupled to each of the joint axes 11b1 to 11b6, and a servo motor (unillustrated) that drives the constitutional element of the robot 11 about the joint axes 11b1 to 11b6. As a matter of course, a configuration of the robot 11 is not limited to the embodiment as illustrated in FIG. 1, but a horizontal articulated robot, a parallel link robot, or the like may be employed.

The sensor 12 as described above is attached to an end effector 20 that is provided to the tip end portion 19 of the robot 11. By adopting this configuration, the sensor 12 according to the present embodiment detects the vibration generated at the tip end portion 19 serving as the control target portion of the robot 11. The sensor 12 is attachable to and detachable from the robot 11. As the end effector 20, a tool portion, a hand portion, a bolt fastening tool, a welding gun, or the like can be used.

As illustrated in FIG. 8, the robot 11 has a world coordinate system 21 that is fixed in a space and a mechanical interface coordinate system 22 that is set at a flange in a tip end of a wrist portion of the robot 11. The world coordinate system 21 and the mechanical interface coordinate system 22 are each a three-dimensional orthogonal coordinate system.

Note that each of the world coordinate system 21 and the mechanical interface coordinate system 22 is illustrated by an enlarged view in FIG. 8 for the sake of convenience. In the world coordinate system 21, +X axis is defined in the right direction of FIG. 8, +Z axis is defined in the upper direction of FIG. 8, and +Y axis is defined in the rear direction of the plane of the drawing of FIG. 8. In the mechanical interface coordinate system 22, +X axis is defined in the right direction of FIG. 8, +Z axis is defined in the lower direction of FIG. 8, and +Y axis is defined in the front direction of the plane of the drawing of FIG. 8. In the present embodiment, correlation of positions between the world coordinate system 21 and the mechanical interface coordinate system 22 is set by calibration in advance. By adopting this configuration, the operation control unit 13 of the robot control device 10 can control the position of the tip end portion 19 of the robot 11 to which the end effector 20 is attached by using the position that is defined by the world coordinate system 21.

As illustrated in FIG. 7, the robot control device 10 according to the present embodiment is mutually connected to the robot 11 through a cable 23. The sensor 12 is communicably connected to the robot control device 10 through a cable or wireless communication.

As the sensor 12 according to the present embodiment, an acceleration sensor is used, but the sensor 12 that can be used is not limited to an acceleration sensor. Further, the sensor 12 according to the present embodiment is provided in the tip end portion 19 of the robot 11, but a place at which the sensor 12 is provided is not also limited to this. In other words, as long as the vibration generated at the control target portion of the robot 11 can be detected, any type of the sensor 12 and any place at which the sensor 12 is provided can be employed. The sensor 12 may be also provided at a place that is distant from the robot 11. Accordingly, as the sensor 12 that can be used, for example, there may be a gyro sensor, an inertial sensor, a force sensor, a laser tracker, a camera, a motion capture device, or the like. These devices can measure a chronological change in a predetermined position and can accordingly detect a vibration amount at a measured position.

For example, in a case of the acceleration sensor, since the position can be calculated by integrating the acceleration at the control target portion of the robot 11 twice, the vibration amount can be detected from the change of the position as calculated. In a case of the force sensor, a rotation angle from an original position of the target portion is determined from the torque or the moment that is generated at the control target portion, and the change amount of the target portion, i.e., the vibration amount can be calculated on the basis of the rotation angle.

Referring to FIG. 1 again, the robot 11 is driven by the servo motor 24. The servo motor 24 include a pulse coder (unillustrated) that detects a position feedback value (hereinafter referred to as position FB) and a speed feedback value (hereinafter referred to as speed FB).

The operation command unit 15 as illustrated in FIG. 1 generates the operation command that makes the robot to operate on the basis of the operation program that is created in advance, and outputs the same to the operation control unit 13. The operation program is stored in a memory such as a ROM in the robot control device 10. In addition, the operation command unit 15 outputs the operation information of the robot 11 described in advance in the operation program to the learning control unit 14.

Further, the operation control unit 13 of the robot control device 10 includes a position control unit 31, a speed control unit 32, a current control unit 33, and an amplifier 34.

The position control unit 31 processes first position deviation amount that is a difference between a position command value provided as the operation command from the operation command unit 15 and the position FB outputted by the servo motor 24, and outputs a speed command value to the speed control unit 32.

The speed control unit 32 processes a speed deviation amount that is a difference between the speed command value provided from the position control unit 31 and the speed FB outputted by the servo motor 24, and outputs a current command value to the current control unit 33.

The current control unit 33 processes a current deviation amount that is a difference between the current command value provided from the speed control unit 32 and the current FB (i.e., current feedback value) from the amplifier 34, and outputs a current command value (torque command value) to the amplifier 34.

The amplifier 34 receives each current command value from the current control unit 33. The amplifier 34 generates a drive current for driving the servo motor 24 on the basis of the current command value as received and drives the servo motor 24.

When the servo motor 24 coupled to each of the joint axes 11b1 to 11b6 of the robot 11 is driven in accordance with the operation command from the operation command unit 15, the tip end portion 19 of the robot 11 to which the end effector 20 is attached moves to the commanded position.

The sensor 12 detects the vibration that is generated at the tip end portion 19 of the robot 11 while the operation control unit 13 performs the operation control of the robot 11 on the basis of the operation command. A detection value of the sensor 12 is configured to be inputted to the learning control unit 14 (see FIG. 2).

The learning control unit 14 is a function part for performing the so-called learning control. Specifically, the operation command unit 15 repeatedly outputs an operation command value to the operation control unit 13 at a prescribed control cycle. The operation control unit 13 controls an operation of the robot 11 by the operation command value and outputs the same operation command value to the learning control unit 14 as well at each control cycle. The learning control unit 14 performs a learning control that calculates the vibration correction amount for correcting the vibration generated at the tip end portion 19 at each time of an input of the operation command value and applies the vibration correction amount to the operation control of the robot 11 by the same operation command at a next time. The learning control unit 14 repeats such the learning control, thereby the vibration generated at the tip end portion 19 of the robot 11 is reduced.

For example, in a production site, the robot operator makes the robot control device 10 to perform the repetitive learning control by using the same operation program as at an actual operation before the robot 11 is made to actually be operated by the operation program. When the vibration at the tip end portion 19 of the robot 11 can be reduced sufficiently by the repetitive learning control, the vibration correction amount calculated at the last time is stored in the memory of the robot control device 10. The vibration correction amount as stored can be used when the robot 11 is made to be actually operated by the operation program in a production site.

Although the sensor 12 is used in order to calculate the vibration correction amount, the sensor 12 is detached from the end effector 20 at the tip end portion 19 of the robot 11 after the learning control is terminated.

In addition, vibration amount data that is required in order to calculate the vibration correction amount is acquired by processing, at each prescribed control cycle, second position deviation amount that is a difference between the operation command value that is inputted from the operation command unit 15 to the learning control unit 14 and the detection value of the sensor 12 that is inputted to the learning control unit 14. Further, the vibration correction amount can be calculated by estimating an approximation formula of the vibration data as acquired and inversely transforming the approximation formula as estimated. In other words, the vibration correction amount is a function for correcting the vibration amount data in a time series into the vicinity of zero.

As already described, the plurality of learning control parts 16a to 16d for determining the vibration correction amount are provided to the learning control unit 14 (see FIG. 2 and FIG. 5). The learning control unit 14 according to the present embodiment includes the selection unit 17 that selects one from among the plurality of learning control parts 16a to 16d on the basis of the operation information of the robot 11 when the learning control is performed as described above. The plurality of learning control parts 16a to 16d are respectively assigned to the plurality of small use ranges $R_1$ to $R_4$ (see FIG. 3) into which the supposed use range UR of the robot 11 is divided.

When the robot 11 is a six-axis vertical articulated robot (see FIG. 7 and FIG. 8), the operation information of the robot 11 includes both information of an orientation of the robot 11 that is obtained from a target position of the tip end portion 19 of the robot 11 that is defined by the world coordinate system 21 and information of a load that the end effector 20 applies to the tip end portion 19 of the robot 11. The information of the robot orientation corresponds to information of a movement range of the tip end portion 19, and the position of the tip end portion 19 can be set to be a position of the origin of the mechanical interface coordinate system 22 based on the origin of the world coordinate system 21. The selection unit 17 is configured to specify one from among the plurality of small ranges $R_1$ to $R_4$ and select the learning control part that corresponds to the small range as specified on the basis of both information of the orientation of the robot 11 and of the load.

According to the robot system 1 and the learning control method as described above, it is configured that the learning control part that matches with one among the plurality of small ranges $R_1$ to $R_4$ into which the supposed use range UR of the robot 11 is divided is selected on the basis of the operation information of the robot 11 when the robot 11 is made to be operated by the program that is a target of the learning control. Such a control can suppress an increase of a number of times of the learning control while a vibration reduction effect due to the learning control is maintained with respect to the supposed use range UR of the robot 11.

Moreover, in a case of the present embodiment, the robustness that is required for each learning control part is low in comparison to a case in which a single learning control part is designed with respect to a wide use range of the robot 11 in which the orientation of the robot 11 and the end effector 20 can widely change. Thus, when the learning control parts are respectively assigned to the plurality of small ranges into which the wide use range of the robot 11 is divided as described in the present embodiment, the vibration correction amount that is optimal can be obtained with a relatively small number of times of the learning control.

According to an aspect of the present disclosure, an increase of a number of times of a learning control can be suppressed while the vibration reduction effect by the learning control is maintained with respect to a supposed use range of a robot.

This invention has been described above by using typical embodiments, but it will be understood that a person skilled in the art could make changes to each constitutional element, function, and the like of the robot system and the robot control device according to the embodiments as described above and various other changes, deletions, and additions without departing from the scope of this invention.

The invention claimed is:

1. A robot system, comprising:
a robot;

a robot control device comprising at least one processor configured to control an operation of the robot; and a sensor configured to detect a vibration generated at a control target portion of the robot, wherein the at least one processor of the robot control device is configured to perform a learning control in which
a vibration correction amount for correcting the vibration generated, when the robot is controlled to operate by an operation command on the basis of an operation program, is calculated, and
the vibration correction amount is employed in the operation command at a next time, the at least one processor includes:
a plurality of learning control parts configured to calculate the vibration correction amount, the plurality of learning control parts being respectively assigned to a plurality of use ranges supposed in the robot;
a selection unit configured to select one from among the plurality of learning control parts on the basis of operation information of the robot when the robot is controlled to be operated in accordance with the operation program; and
a determination unit configured to determine whether or not the selected learning control part is optimal on the basis of information of the vibration acquired from the sensor while the learning control is performed,
wherein the selected learning control part is determined as optimal when the vibration detected by the sensor is reduced by the selected learning control part, and
wherein when the selected learning control part is determined to be not optimal by the determination unit, the selection unit is configured to switch to another learning control part among the plurality of learning control parts to perform the learning control, the operation information includes
position information of a position to which the control target portion being a tip end portion of the robot is controlled to move, and
load information of a load applied to the tip end portion by an end effector attached to the tip end portion, and each of the plurality of use ranges is defined by both
a range of the position to which the tip end portion of the robot is controlled to move, and
a range of the load in accordance with the end effector.

2. The robot system according to claim 1, wherein the selection unit is configured to
specify one from among the plurality of use ranges on the basis of the position information and the load information, and
select the learning control part corresponding to the specified use range among the plurality of learning control parts.

3. The robot system according to claim 1, wherein the selection unit is configured to perform switching to another learning control part until the vibration acquired from the sensor is reduced to a value that is less than a vibration before employing the vibration correction amount.

4. A learning control method of a robot for performing a learning control in which a vibration correction amount for correcting a vibration generated at a control target portion of the robot, when the robot is controlled to operate by an operation command on the basis of an operation program, is calculated, and
the vibration correction amount is employed in the operation command at a next time, the learning control method comprising:
acquiring, by a computer including a plurality of learning control parts, operation information of the robot from the operation program, the plurality of learning control parts being configured to calculate the vibration correction amount and being respectively assigned to a plurality of use ranges supposed in the robot;
selecting, by the computer, one from among the plurality of learning control parts by the computer on the basis of the operation information; and
performing the learning control by the selected learning control part of the computer, wherein the operation information includes
position information of a position to which the control target portion being a tip end portion of the robot is made to move, and
load information of a load applied to the tip end portion by an end effector attached to the tip end portion, each of the plurality of use ranges is defined by both
a range of the position to which the tip end portion of the robot is controlled to move, and
a range of the load in accordance with the end effector, a sensor configured to detect the vibration generated at the control target portion is attached to the robot, and the learning control method further comprises:
determining, by the computer, whether or not the selected learning control part is optimal on the basis of information of the vibration acquired from the sensor while the learning control is performed, wherein the selected learning control part is determined as optimal when the vibration detected by the sensor is reduced by the selected learning control part; and
when the selected learning control part is determined to be not optimal, switching, by the computer, to another learning control part among the plurality of learning control parts to perform the learning control.

5. The learning control method of a robot according to claim 4, wherein
the selecting includes
specifying one from among the plurality of use ranges on the basis of the position information and the load information, and
selecting the learning control part corresponding to the specified use range among the plurality of learning control parts.

6. The learning control method of a robot according to claim 4, wherein
the switching to another learning control part is performed until the vibration acquired from the sensor is reduced to a value that is less than a vibration before employing the vibration correction amount.

* * * * *